July 14, 1959 B. L. LIEB ET AL 2,895,087

ACCESSIBLE MODULAR CONSTRUCTION

Filed Aug. 29, 1957 2 Sheets-Sheet 1

INVENTOR.
BERNARD L. LIEB
HAROLD E. BRYAN
BY ALLEN T. STEINKAMP
George Lipkin
George E. Pearson
ATTORNEYS

ACCESSIBLE MODULAR CONSTRUCTION

Filed Aug. 29, 1957 2 Sheets-Sheet 2

INVENTOR.
BERNARD L. LIEB
HAROLD E. BRYAN
BY ALLEN T. STEINKAMP
George Sipkin
George E. Pearson
ATTORNEYS United States Patent Office 2,895,087

Patented July 14, 1959

2,895,087

ACCESSIBLE MODULAR CONSTRUCTION

Bernard L. Lieb, San Diego, Harold E. Bryan, La Mesa, and Allen T. Steinkamp, San Diego, Calif.

Application August 29, 1957, Serial No. 681,146

3 Claims. (Cl. 317—101)

(Granted under Title 35, U.S. Code (1952), sec. 266)

The invention described herein may be manufactured and used by or for the Government of the United States of America for governmental purposes without the payment of any royalties thereon or therefor.

This invention relates to the housing of electronic equipment and more particularly to a type of construction utilizing accessible modular sub-assemblies.

The conventional method for mounting electronic equipment is on the "inverted dishpan" type of chassis. These chassis are equipped with panels and contained in metal housings in a manner similar to drawers, in that they can be pulled in and out for servicing. In multiple panel units, usually only one panel can be pulled at a time due to interference with accessibility. In order to apply power to the unit in a service position, it is necessary either to use a "wind-up" cable for connections or to use patch cables since the plug circuits are broken. During the time the equipment is being serviced it is usually inoperative which may make the location of any trouble difficult. Replacing faulty components may require the panel to be moved from the rack to a work bench, sometimes necessitating the employment of two people.

The present invention greatly augments the convenience afforded by the accessible modular constructed enclosure by utilizing modular sub-assemblies suitable for most electronic applications. It comprises light weight modular units which plug into and mount on the back of a compound hinged front door panel fitted into an associated enclosure. When the door is in the open position the modules can be tested in operation without additional test cables or jigs. The units may be built in multiple widths, each width having guide fasteners for mounting to the door panel and a guide pin for supporting the rear of the modular. Each module has ample room on the back plate for necessary test points. Decks are used for mounting electronic parts and may be varied in position and height. The lower front face of the module has openings for mounting connectors for each width. The sub-assembly package consists of hinging the door panel, with the attached modules, to an enclosure which includes space for line filters and cables. The depth of the door is used to contain various parts, switches, etc. The mating coax and multiple pin connections for the modules are located on the inside face of the door panel on a section which is removed for ease of wiring and installation of parts.

An object of this invention is to provide a sub-assembly packaging unit for housing electronic components which are simple and inexpensive to construct and can be assembled into a complete cabinet.

Another object is to provide a sub-assembly packaging system for electronic equipment utilizing light weight modular units which plug into and mount on the back of a compound hinged front door panel fitted onto an associated enclosure for rapid and easy maintenance.

Another object of the present invention is to provide a cabinet for electronic units which facilitates the rapid and easy maintenance of equipment while in operation and by quick replacement of module units.

A final object of the present invention is to provide a type of construction for electronic equipment which has excellent heat transfer characteristics and withstands shock and vibration without damage, also withstands specified environmental conditions as well as promotes standardization and simplifies production problems.

Other objects and many of the attendant advantages of this invention will be readily appreciated as the same becomes better understood by reference to the following detailed description when considered in connection with the accompanying drawings wherein.

Figure 1:
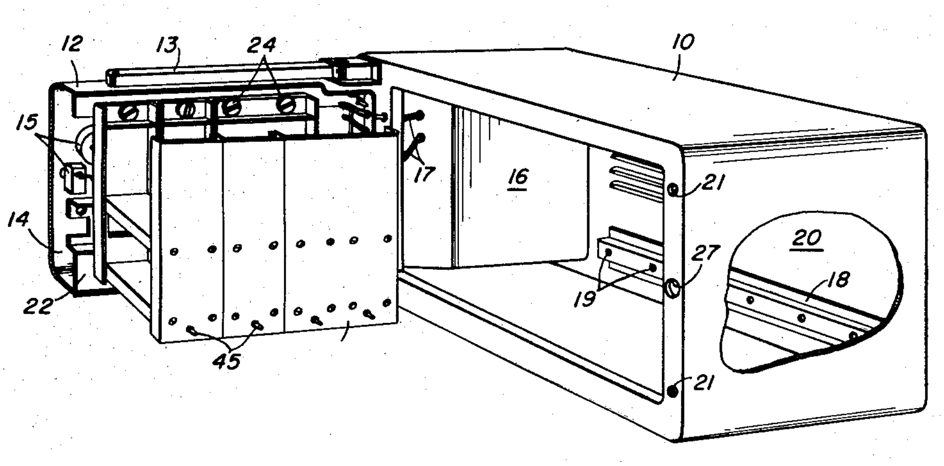
Fig. 1 illustrates the enclosure showing a portion of the door panel in an open position.
Figure 4:
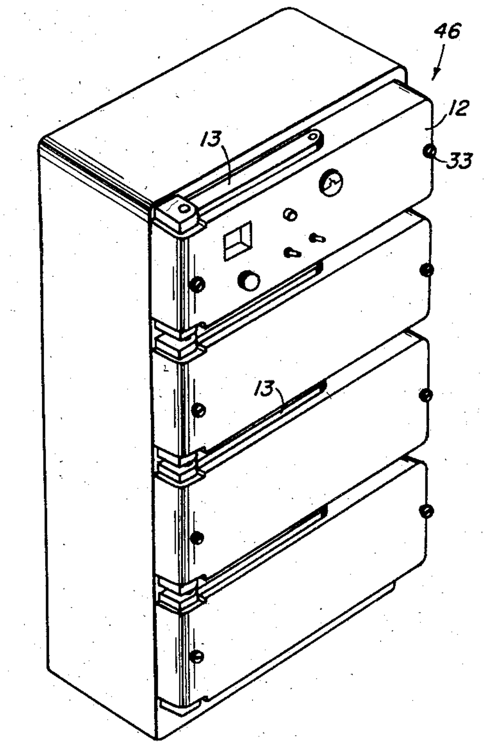
Fig. 4 illustrates stacked enclosures forming a complete cabinet.
Figure 2:
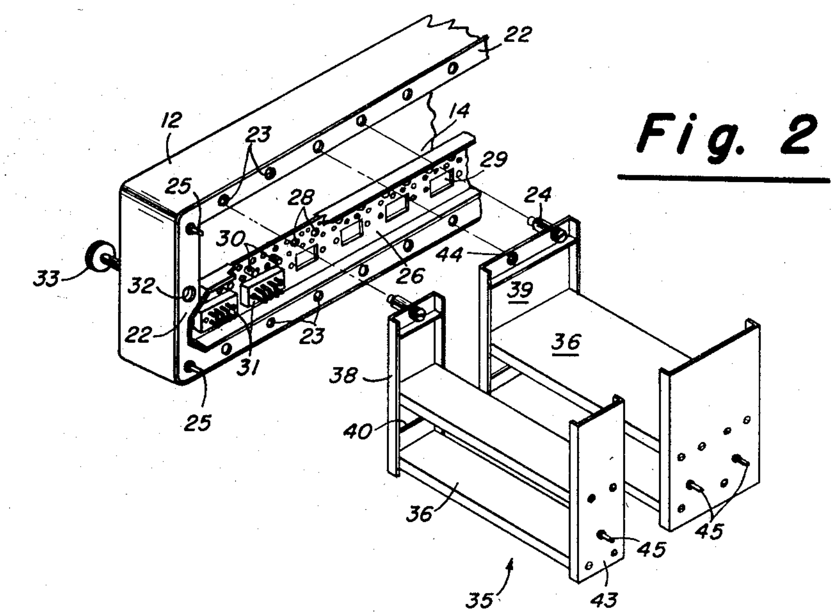
Fig. 2 is an exploded view of the door panel assembly with a portion removed.
Figure 3:
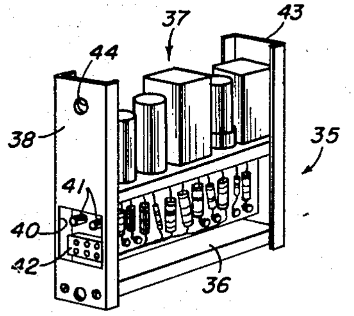
Fig. 3 is one of the sub-assemblies of Fig. 1 showing electronic components mounted thereon.

Referring to the drawings, wherein like reference characters designate like or corresponding parts throughout the several views, there is shown in Fig. 1 the enclosure 10 made of any suitable material such as metal, consisting of a front door panel 12, supported by compound hinge 13 which permits the door 12 to be opened with a straight back and to the left movement eliminating the lost space that would result from the arc of swing in a single point hinge. The door panel 12 is provided with adequate space 14 for containing various parts such as dials, switches 15, etc. A compartment 16 is located on the inside of the enclosure 10 for housing line filters or cables 17. A channel 18 having holes 19 for engaging guide pins 45 is secured to the inside back 20 of the enclosure 10. Holes 21 are for engaging guide pins 25 and hole 27 is for captive screw 33. The inside flange 22 of the door panel 12 as shown in Fig. 2 has holes 23 for engaging guide fasteners 24, clearance holes 32 for captive screw 33 and guide pins 25 for engaging the holes 21 of enclosure 10. The inside face plate 26 which may be removed for ease of wiring and installation of parts may be divided into uniform widths corresponding with the width of the module sub-assembly 35. Each width has holes and openings 28 and 29 for mounting coax and multiple connectors 30 and 31 respectively. The module sub-assembly 35 may be made of anodized aluminum alloy sheet or other suitable material having decks 36 used for mounting electronic parts 37 as shown in Fig. 3. Each deck can be varied in position and height. The front face 38 of the module 35 may be built in different widths, such as the double width module 39, each width being a multiple of the smaller module and each width having openings 40 for mounting coax and multiple pin connectors 41 and 42 that mate with 30 and 31 respectively. Each width has mounting holes 44 on front face 38 for securing to the door panel 12 and guide pins 45 on the rear panel 43 for supporting the rear of the modules 35. The enclosures 10 can be assembled in a stacked manner 46 as shown in Fig. 4 to form a complete cabinet.

Obviously many modifications and variations of the present invention are possible in the light of the above teachings. It is therefore to be understood that within the scope of the appended claims the invention may be practiced otherwise than as specifically described.

What is claimed is:

1. A box-shaped door panel hinged to an enclosure, said door having space therewithin for containing electronic parts, a removable face panel having coax and multiple connectors and identical means for detachably securing a plurality of sub-assemblies in single or multiple unit sizes equipped with electronic equipment to said door panel, guide pins carried by said door panel and the rear of said sub-assemblies and supported in the guide holes on the face of said enclosure and the rear wall thereof, respectively, said door panel having means for pivotally securing the same to an enclosore having supply cables and space therewithin for housing said sub-assemblies, said means for pivotally securing the door panel to the enclosure comprising a compound hinge for engaging or disengaging said supporting guide pins in said guide holes by a relative movement in a generally axial direction and coupling means for connecting said cables to said door panel, said sub-assemblies having mating coax connectors for plugging into said door panel whereby the electronic equipment can be serviced in operation when the door is in an open position.

2. In an electrical control cabinet for mounting a plurality of sub-assemblies comprising an enclosure having an open side, a sub-assembly mounting panel hinged to the open side of said enclosure, single unit and multi-unit sub-assemblies, identical means for mounting both single and multi-unit sub-assemblies on said panel to form a panel section, slidable engaging and disengaging support means carried by said door panel and said enclosure for assisting the hinge in firmly supporting said sub-assemblies in said enclosure, and a panel hinge adapted to freely engage or disengage said slidable support means in a generally tangential direction while swinging the panel through an arc during opening or closing operations.

3. In an electrical control cabinet, for mounting a plurality of sub-assemblies comprising a rectangular housing having a flanged facing, a support member fastened to the back of said housing along the lower portion thereof and provided with a series of equally spaced guide holes, a box shaped door panel provided with an inside flange adapted to abut upon said facing, a plurality of sub-assembly frames in single and multiple unit sizes, identical means for detachably fastening said single or multiple unit size frames to said door flange, said frames extending to the rear of said housing and provided with guide pins supported at the rear in guide holes of said support member, meshing guide holes and pins located in said housing and door flange respectively for supporting said frames at the forward end, and a compound hinge for opening and closing said door panel and thereby engaging or disengaging said supporting guide pins in said guide holes by a relative movement in a generally axial direction, said door being pivotally supported by said hinge approximately along the vertical center-line thereof.

References Cited in the file of this patent

UNITED STATES PATENTS

| | | |
|---|---|---|
| 2,594,565 | Kenney | Apr. 29, 1952 |
| 2,614,157 | Montgomery | Oct. 14, 1952 |
| 2,688,716 | Eging | Sept. 7, 1954 |
| 2,825,009 | McCoy | Feb. 25, 1958 |